United States Patent [19]

Shiina

[11] 4,099,736

[45] Jul. 11, 1978

[54] MUDGUARD FOR A VEHICLE

[76] Inventor: Akira Shiina, 60 Nukari, Kamiyoshima, Yoshima-machi, Iwaki-shi, Fukushima Prefecture, Japan

[21] Appl. No.: 748,183

[22] Filed: Dec. 7, 1976

[30] Foreign Application Priority Data

Jun. 11, 1976 [JP] Japan .................................. 51-075852

[51] Int. Cl.² ............................................ B62D 25/16
[52] U.S. Cl. ............................................ 280/154.5 R
[58] Field of Search ................ 280/154.5 R; 428/156; 160/332

[56] References Cited

U.S. PATENT DOCUMENTS 3,953,053  4/1976  Arenhold ...................... 280/154.5 R

FOREIGN PATENT DOCUMENTS 1,062,554  3/1967  United Kingdom .......... 280/154.5 R
1,205,076  9/1970  United Kingdom .......... 280/154.5 R Primary Examiner—Robert R. Song
Attorney, Agent, or Firm—Fleit & Jacobson

[57] ABSTRACT

This invention relates to a mudguard for a vehicle to prevent splashing of mud and pebbles by the running wheels outside of the vehicle. The mudguard consists of an attaching plate and a main plate which are thinned stepwise to their ends respectively. The mudguard is attached on the vehicle body by attaching members so that one side of the main plate is protruded outward slightly to the direction of the width of the vehicle body. Such a construction can prevent splashing of mud and pebbles outside of the vehicle by a turning front wheel when the mudguard is used there, and provides a durable and easily attachable mudguard.

7 Claims, 10 Drawing Figures

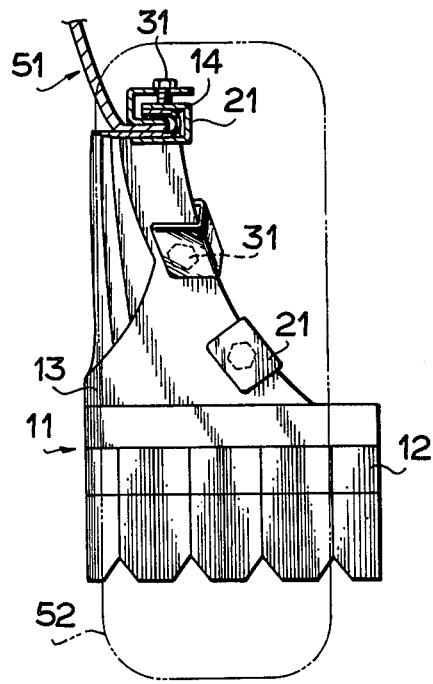
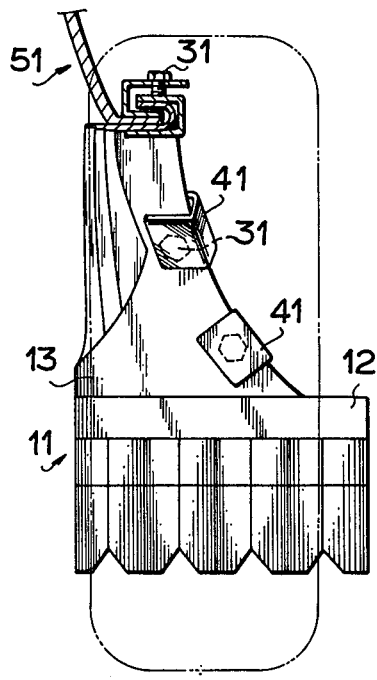
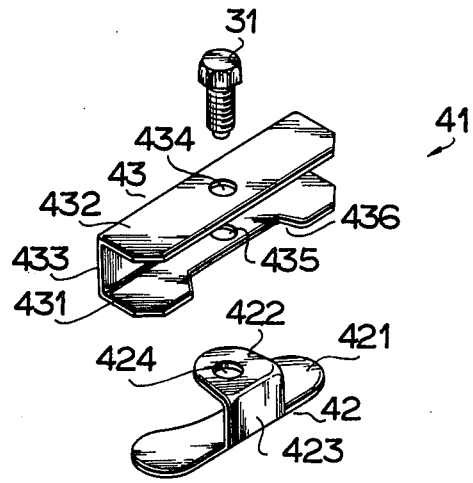
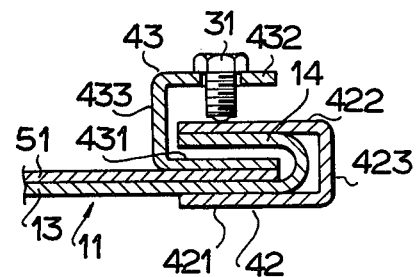
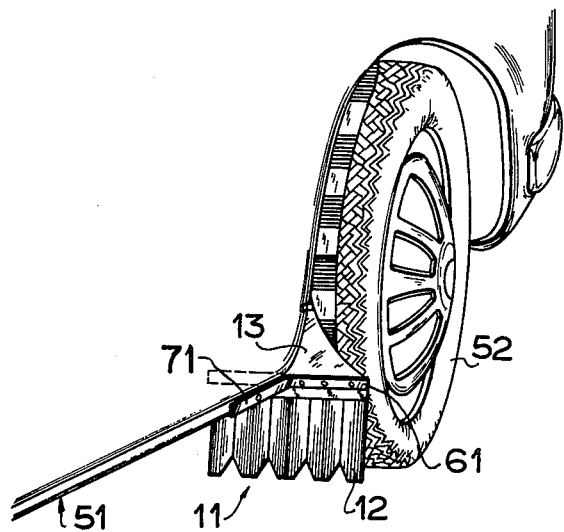

MUDGUARD FOR A VEHICLE

BACKGROUND OF THE INVENTION

The present invention relates to a mudguard for a wheel, and more particularly to a mudguard hanging close to the back of a wheel. Generally, a mudguard for a wheel of a vehicle consists of a flexible material such as rubber and is stuffed with reinforcing cloths in the core of a mudguard plate and is hung at the rear end of the fender of a vehicle.

A drawback in such a construction is that mud and pebbles are splashed outside of a vehicle when the front wheel is turned by steering the handle and a part of a wheel is protruded outside of the fender because a mudguard plate is not extended outside of the fender. Moreover, it takes time to attach a mudguard to the body of a vehicle.

SUMMARY OF THE INVENTION

An object of the invention is to provide a mudguard of a vehicle when prevents splashing of mud and pebbles outside of a vehicle when the front wheel is turned.

Another object of the invention is to provide a mudguard which is easily attached to the body of a vehicle.

A further object of the invention is to provide a mudguard which is useful for preventing accidental collision with a vehicle.

An additional object of the invention is to provide a mudguard which has a durable and presentable mudguard plate.

A further object of the invention is to provide a mudguard whose plate can be attached to the body of a vehicle without damage.

The mudguard plate of the invention, in the case of a front wheel, is attached close to the back of a front wheel, and the main plate of the mudguard plate is hung slightly extending outward to the direction of the width of a vehicle body.

Therefore, mud and pebbles are not splashed outside of a vehicle by a turning front wheel when a vehicle is steered because the main plate of the mudguard is positioned at the back of a front wheel which is protruded outside of the body of a steering vehicle.

Moreover, the mudguard plate is hung close to the back of a rear wheel and is painted with an attractive fluorescent paint and can prevent a collision accident by a reflecting light from the fluorescent paint on the mudguard plate even in the darkness of night and rainy weather.

BRIEF DESCRIPTION OF THE DRAWING

FIG. 6 is a partially sectional rear elevation of FIG. 5.

FIG. 7 is an exploded perspective view showing another example of an attaching member.

FIG. 8 is a partially sectional rear elevation of a mudguard plate attached to a vehicle body by an attaching member of FIG. 7.

FIG. 9 is an enlarged transverse sectional view of the part where a mudguard is attached to the body of a vehicle by an attaching member of FIG. 8.

FIG. 10 is a perspective view embodying another form of attaching a mudguard plate to a vehicle body and looking sideways from the back of a vehicle.

DESCRIPTION OF THE PREFERRED EMBODIMENTS.

Figure 1:
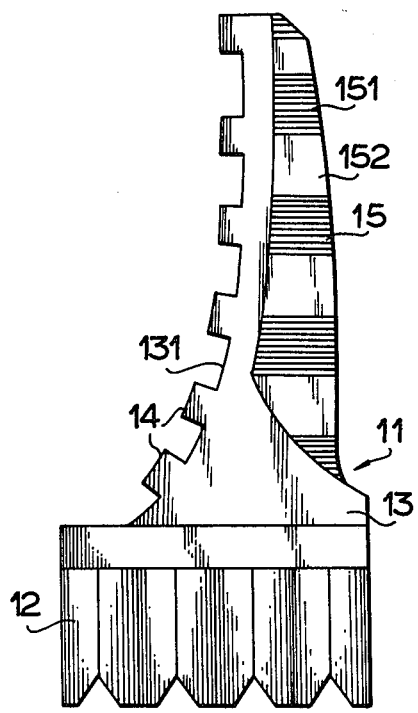
FIG. 1 is an elevation view of a mudguard plate of this invention.
Figure 2:
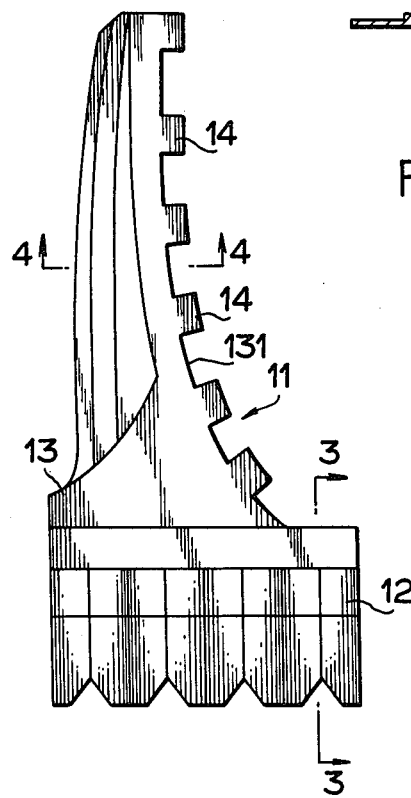
FIG. 2 is a rear elevation thereof.
Figure 3:
FIG. 3 is a cross section taken on line 3—3 in FIG. 2.
Figure 4:
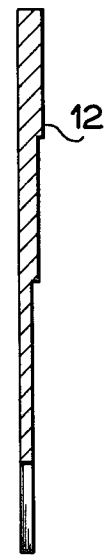
FIG. 4 is a cross section taken on line 4—4 in FIG. 2.

Referring first to the embodiment of the invention shown in FIG. 1-4 inclusive, a mudguard plate 11 is composed of a flexible substance such as rubber and may be stuffed with a reinforcing core (not shown) and is provided with a main mudguard plate 12 which is thinned stepwise to the direction of its lower side and an attaching plate 13 which is formed integrally with the main guard plate 12 and is thinned stepwise to the direction of its one side. The thicker edge of the attaching plate 13 is in the form of arc and is narrowed to the direction of its upper part, and the one side of the main mudguard plate 12 is protruded from the lower part of the curved thicker edge 131. A plurality of protruded parts for attaching 14 are formed integrally with the attaching plate 13 and are protruded from said curved thicker edge 131 at certain intervals from each other. As shown in FIG. 1 a part of the surface of the attaching plate 13 is painted in a striped patterns of attractive red parts 151 and yellow parts 152 with a fluorescent paint.

Figure 5:
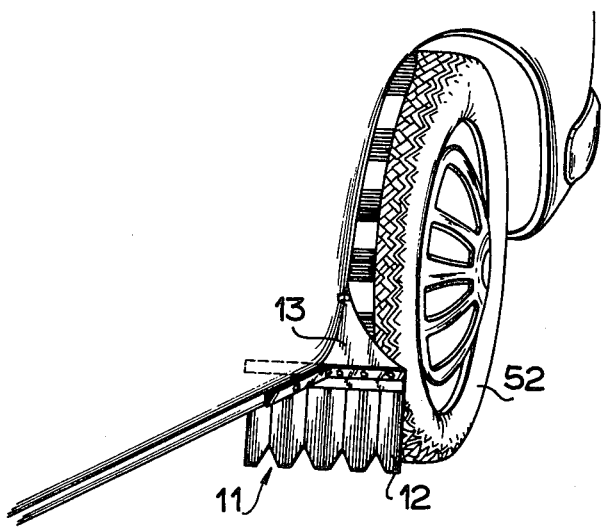
FIG. 5 is a perspective view embodying one form of attaching a mudguard plate to a vehicle body and looking sideways from the back of a vehicle.

As shown in FIG. 5 and FIG. 6, the mudguard plate 11 is hanged from the part of the body 5 of a vehicle by an attaching member 21 having a ]-shaped sectional surface. As shown in FIG. 6, when the mudguard plate 11 is attached to the body 51 of a vehicle, the attaching plate 13 is fitted to the body 51, and each of the protruded parts for attaching 14 is folded inwards and is inserted in the attaching member 21. The protruded part for attaching 14 is fixed to the body of a vehicle by a fixing bolt 31 through the side wall of the attaching member.

As shown in FIG. 5 of one embodiment in the case of a front wheel of the invention, the main plate 12 of the mudguard plate is attached close to the back of a front wheel 52, and the main plate 12 is hung slightly outward to the direction of the width of the vehicle body 51. Therefore, mud and pebbles are not splashed outside of a vehicle by a turning front wheel 52 when a vehicle is steered because the main plate 12 of the mudguard is positioned at the back of a front wheel which is protruded outside of the body of a steering vehicle.

Moreover, the mudguard plate 11 is hung close to the back of a rear wheel (not shown) and is painted with an attractive fluorescent paint 15 and can prevent a collision accident by a reflecting light from the fluorescent paint 15 on the mudguard plate 11.

As mentioned above, the main plate 12 and the attaching plate 13 of the mudguard plate 11 have stepwise thinned sections and consist of thick and thin parts of their thickness, so they are durable and presentable without a reinforcing core.

An attaching member 41 may be used to attach the mudguard plate as shown in FIG. 7 and FIG. 9. The attaching member 41 is provided with an attaching body 42 which is made of substantially rigid material such as a metal plate and a holding body 43 which is made of an elastic metal. The attaching body 42 has a ]-shaped sectional area and is composed of a side wall 421 and a side wall 422 which is nearly triangle in shape and shorter than the preceding side wall 421 which are positioned on opppsite sides of a connecting wall 423. A screw hole is formed in the side wall 422. The holding body also has a ]-shaped sectional area and is composed of a side wall 431 which is the holding part of the attaching member 41 and a side wall 432 which has a hole 434 in which a fixing bolt 31 is movably inserted. Side walls 431 and 432 are positioned on opposite sides of a connecting wall 433. The side wall 431 is provided with a hole 435 which defines the position of the fixing bolt 31 and an excision part 436 to prevent the holding member from turning. The side wall 431 which is the holding part of the holding body is inserted into the groove between the side wall 421 and 422 of the attaching body 42, and side attaching body 42 is made to engage with the holding body 43. The fixing bolt 31 is movably inserted from the outside of the side wall 432 and is screwed in the screw hole 424 on the side wall 421 of the attaching body which is positioned in the groove of a holding body 6, and the top of the bolt 31 is positioned close to the side wall 431 which is provided inside of the holding body 43 engaged with the attaching body 42. The excision part 436 which is provided at the side wall 431 is fitted in the connecting wall 423 of the attaching body 42 and the holding body 43 is made not to rotate around the bolt 31.

As shown in FIG. 8 and FIG. 9, when the mudguard plate 11 is attached to the body 51 of a vehicle with the attaching member 41, the main plate 12 is fitted to the vehicle body 51 and the protruded part 14 is folded inwards and the attaching member is fixed to that position. The protruded part 14 of the mudguard plate 11, the vehicle body 51 and the attaching plate 13 are fixed between the side wall 421 of the attaching body 42 and the side wall 431 of the holding body 43 by the fixing bolt 31.

The attaching plate 13 and the protruded part 14 are fixed by the wide holding area of the side wall 421 and 431 of the attaching body 42 and the holding body 43 respectively, so they are fixed safely and surely without damage.

Moreover, the attaching operation of the mudguard plate 11 is proceeded with the combined state of the attaching body 42 and the holding body 43 and the fixing bolt 31 is attached , so it can be finished in a narrow space and easily.

As shown in FIG. 10, an attaching member 71 which is integrally provided with a stay 61 extending outwards crossing one end of the holding body and forming T in shape is attached to the low edge of the vehicle body 51 and said stay 61 is fitted to the low part of the attaching plate 13 which is held between a flat plate (not shown) and a stay 8, thus the mudguard plate 11 may be attached to the vehicle body 51. In this case, the attaching member 71 can be attached to the convex part of a fender.

As apparently widely different embodiments of this invention may be made without departing from the spirit and scope thereof, it is to be understood that the invention is not limited to the specific embodiments thereof except as defined in the appended claims.

What I claim is:
1. A mudguard assembly for a vehicle comprising:
 (a) an integral mudguard formed of an elastic material and having an attaching plate with a curved side so that the plate narrows gradually towards one end, the thickness of said attaching plate decreasing in stepwise manner in a direction from the curved side to the side opposite the curved side;
  a plurality of spaced-apart members protruding from the curved side of said attaching plate; and
  a mudguard main plate connected to the end of said attaching plate opposite the narrow end, the thickness of said main plate decreasing in stepwise manner from the end connected to the attaching plate to the end opposite the connected end; and
 (b) a plurality of attaching members for attaching said attaching plate to the body of a vehicle, each of said attaching members having:
  (1) an attaching body with a generally ]-shaped sectional area and having a groove defined by its side walls, one of its side walls having a threaded opening defined therein,
  (2) a holding body engageable with the attaching body and having a generally ]-shaped sectional area, one side wall of the holding body being positionable inside the groove defined by the side walls of the attaching body, the other side wall of the holding body having an opening defined therein and being positionable outside of the groove, and
  (3) a threaded bolt insertable through the openings in the side walls of said attaching body and said holding body for connecting said bodies to each other so that parts of the body of the vehicle and the curved side of said attaching plate are positioned and held between the side walls of said attaching body and said holding body.

2. A mudguard for a vehicle as claimed in claim 1 wherein a part of the surface of said attaching plate is painted with fluorescent paint.

3. A mudguard assembly for a vehicle as claimed in claim 1 wherein the holding body of the attaching member is made of an elastic metal plate.

4. A mudguard for a vehicle is claimed in claim 1, wherein one side of the mudguard main plate is adapted to protrude slightly beyond the side of the vehicle body in the direction of the width of the vehicle body when the mudguard assembly is mounted on the vehicle body.

5. A mudguard assembly as claimed in claim 1 wherein each of said members protruding from the curved side of said attaching plate is adapted to be folded around a part of the body of the vehicle and releasably held thereto by one of said attaching members.

6. A mudguard assembly for a vehicle as claimed in claim 1 wherein the holding body of the attaching member is provided integrally with a stay which extends to the side of said holding body and is adapted to be fixed to the lower part of the attaching plate.

7. An integral mudguard for a vehicle comprising:
 an attaching plate having a curved side so that the plate narrows gradually towards one end, the thickness of said attaching plate decreasing in stepwise manner in a direction from the curved side to the side opposite the curved side;
 a plurality of spaced-apart members protruding from the curved side of said attaching plate; and
 a mudguard main plate connected to the end of said attaching plate opposite the narrow end, the thickness of said main plate decreasing in stepwise manner from the end connected to the attaching plate to the end opposite the connected end.

* * * * *